(12) United States Patent
Siddiqui et al.

(10) Patent No.: US 6,826,176 B1
(45) Date of Patent: Nov. 30, 2004

(54) CONNECTIONLESS MEDIA TRANSMISSION WITHOUT BEARER-CHANNEL CONTROL SIGNALING

(75) Inventors: Aqeel Siddiqui, Dallas, TX (US); Jo Kuster, Prosper, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/574,121

(22) Filed: May 17, 2000

(51) Int. Cl.[7] .............................................. H04L 12/66
(52) U.S. Cl. ........................ 370/352; 370/389; 370/465; 379/88.17; 379/100.15; 379/219
(58) Field of Search ................................ 370/352, 353, 370/354, 355, 389, 392, 395.5, 395.31, 395.65, 396, 397, 400, 401, 410, 465, 466, 469, 473, 402, 256, 408; 379/88.17, 100.15, 156, 220.01, 219

(56) References Cited

U.S. PATENT DOCUMENTS

| | | | | |
|---|---|---|---|---|
| 5,214,646 | A | * | 5/1993 | Yacoby ...................... 370/402 |
| 6,360,265 | B1 | * | 3/2002 | Falck et al. .................. 709/227 |
| 6,539,029 | B1 | * | 3/2003 | Toivanen ..................... 370/466 |
| 6,594,246 | B1 | * | 7/2003 | Jorgensen ................... 370/338 |

OTHER PUBLICATIONS

Deploying H.323 Applications in CISCO Networks, Sam Kotha, Cisco Systems, Inc.*
Media Gateway Control Protocol and Voice over IP Gateways,L.P.Anquetil, J. Bouwen, A. Conte, B. Van Doorselaer.*
Kotha S: "Deploying H.323 Applications in Cisco Networks" Cisco Systems, 'Online! 1998, XP002158720 Retrieved from the Internet: <URL:http://www.cisco.com/warp/publc/cc/pd/iosw/ioft/mmcm/tech/h323_wp.pdf>'retrieved on Mar. 1, 2002! p. 4, left–hand column, line 10–line 40.
Anquetil L–P et al.: "Media Gateway Control Protocol and Voice Over IP Gateways. MGCP and VOIP Gateways Will Offer Seamless Interworking of New VOIP Networks with Today's Telephone Networks" Electrical Communication, ALCATEL. Brussels, BE, Apr. 1, 1999, pp. 151–157, XP000830045 ISSN: 0013–4252 the whole document.

* cited by examiner

*Primary Examiner*—Dang Ton
*Assistant Examiner*—Inder Pal Mehra
(74) *Attorney, Agent, or Firm*—Roger S. Burleigh

(57) ABSTRACT

A media gateway (MGW), and methods related thereto, for controlling the routing of data packets through a "connectionless" packet-switched network, without bearer-channel control signaling. In an exemplary embodiment, an Integrated Services Digital Network User Part (ISUP) Initial Address Message (IAM) is transmitted from a controller 110-A associated with a MGW 120-A to a controller 110-B associated with a MGW 120-B; the IAM includes a source address for data packets at the MGW 120-A. The controller 110-B sends a resource allocation message to the MGW 120-B, which defines and stores an association between the source address for the data packets and an address associated with the MGW 120-B in a mapping table 230. Subsequently, when the MGW 120-B receives a broadcast message including an unknown destination indicator, it queries the mapping table 230 using the source address of the broadcast message. If the source address of the broadcast message is found in the mapping table 230, the MGW 120-B retrieves the address of the MGW 120-B that is mapped to the source address and routes the broadcast message to that address.

18 Claims, 4 Drawing Sheets

FIG. 3

PORT MAPPING TABLE

| External Node Address | External UDP Port Address | Internal UDP Port Address |
|---|---|---|
| MGW 120-A | "5555" | "6666" |
| MGW 120-A | ... | ... |
| MGW 120-A | ... | ... |
| MGW 120-C | ... | ... |
| MGW 120-D | ... | ... |
| MGW 120-E | | |

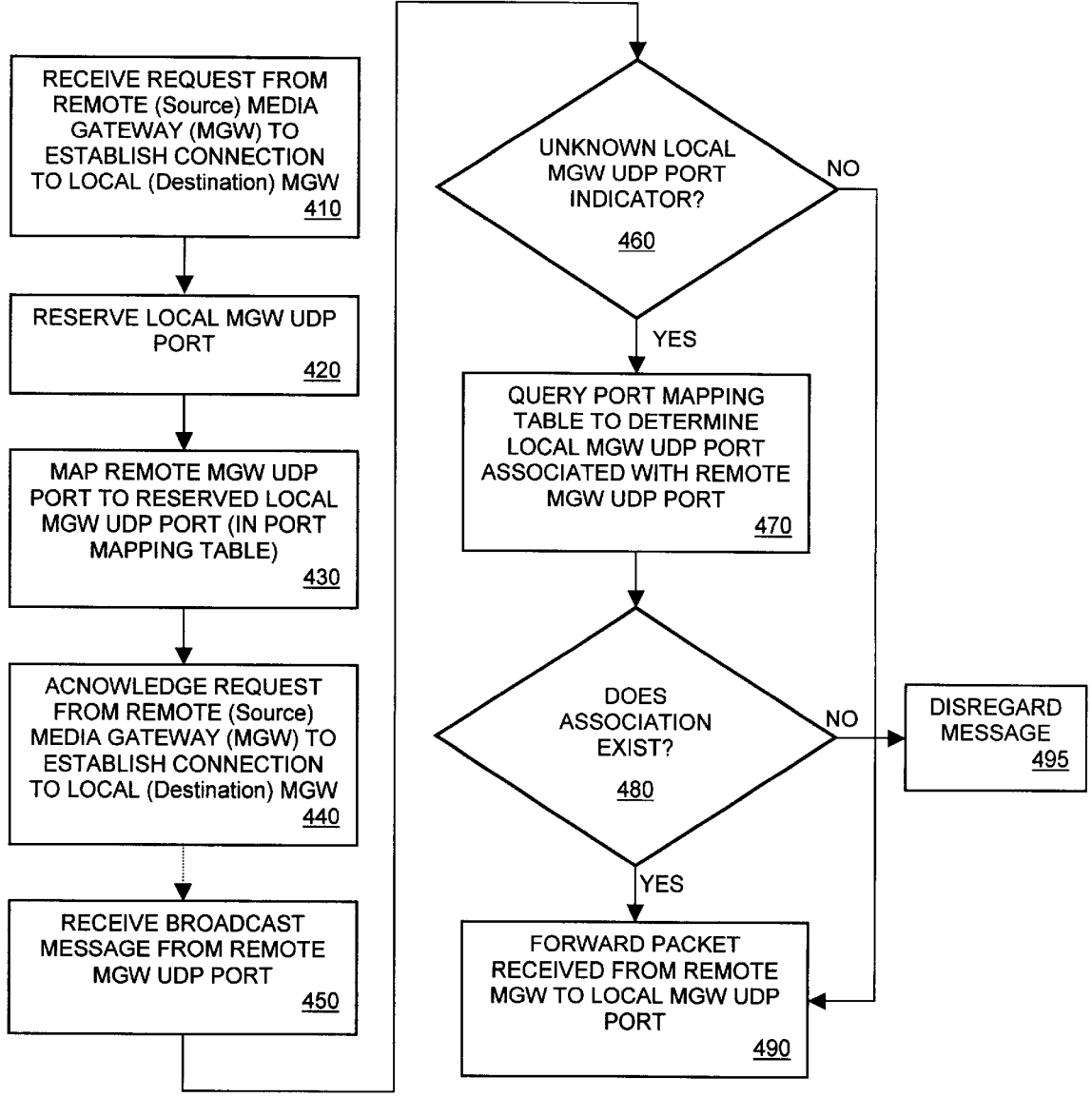

CONNECTIONLESS MEDIA TRANSMISSION WITHOUT BEARER-CHANNEL CONTROL SIGNALING

TECHNICAL FIELD OF THE INVENTION

The present invention is directed, in general, to communications systems and, more specifically, to controlling the routing of data packets through a "connectionless" packet-switched network, without bearer channel control signaling.

BACKGROUND OF THE INVENTION

Conventional communications networks, such as the Public Switched Telephone Network (PSTN), are "connection-oriented" networks; connection-oriented networks require a bearer channel to be established between a sending node and a receiving node before any messages are transmitted therebetween. The PSTN utilizes the Signaling System 7 (SS7) control signaling, including the Integrated Services Digital Network (ISDN) User Part (ISUP), to establish such bearer channels; ISUP defines the protocol and procedures used to set-up, manage, and release trunk circuits that carry voice and data calls over the PSTN.

In recent years there has begun a convergence of communications networks, including the use of the public Internet for the transmission of voice calls historically carried by the PSTN, as well as the transmission of audio, video and data. Unlike the PSTN, the Internet is generally a "connectionless" network that does not require a bearer channel to be established between a sender and receiver before any messages are transmitted. Because the protocols defined by ISUP depend on bearer channel control signaling to establish such channels between network-nodes, ISUP is not generally suited for controlling the transmission of data between Internet nodes, such as media gateways.

Because it is desired to further converge conventional connection-oriented communications networks, such as the PSTN, with connectionless packet-switched networks, such as the Internet, there is a need in the art for systems and methods that allow connection-oriented protocols to control the routing of data through connectionless networks. In particular, there is a need in the art for methods of adapting the use of ISUP to control the routing of data between media gateways associated with a packet-switched network, such as the public Internet. Preferably, such methods should be transparent to the control network that utilizes ISUP; i.e., no modifications to the standard ISUP protocols should be required.

SUMMARY OF THE INVENTION

To address the above-discussed deficiencies of the prior art, the present invention relates to a media gateway (MGW), and methods relating thereto, for controlling the routing of data packets through a "connectionless" packet-switched network, without bearer channel control signaling. In general, a MGW is operative to receive a connection request associated with a remote MGW, wherein the connection request includes a source address associated with the remote MGW; the MGW defines and stores an association between the source address associated with the remote MGW and a particular port address of the MGW in a mapping table. Subsequently, when the MGW receives a broadcast message that includes an unknown destination indicator, it queries the mapping table using the source address of the broadcast message. If the source address of the broadcast message is found in the mapping table, the MGW retrieves the address associated with the MGW that is mapped to that source address and routes the broadcast message to that address. In this manner, data packets can be communicated through the MGW without the remote MGW knowing the address associated with the MGW.

In exemplary embodiments, the source address includes an Internet Protocol (IP) address of the remote MGW and a port address associated therewith, such as a User Datagram Protocol (UDP) port designator. In order to route data packets through the MGW, when the remote MGW does not provide a particular UDP port address at the MGW, an association is defined between the source address and a particular port address of the MGW; this association can be stored in a port mapping table. When a broadcast message including an unknown destination indicator is received at the MGW, the port mapping table is queried using the source address of the broadcast message to determine a particular port address associated with the MGW, if any, and the broadcast message is then routed to the particular port address. The MGW can then send a message to the source MGW to inform it of the particular port address to which subsequent data packets can be sent, thereby eliminating any further need for the source MGW to send such data packets using broadcast messages.

The connection request can be received by a controller associated with the second MGW from a controller associated with the remote MGW. In a specific embodiment described hereinafter, the packet-switched network utilizes Internet Protocol (IP) addressing for the MGWs; the controllers associated with the MGWs, however, communicate using Integrated Services Digital Network User Part (ISUP) protocols and each controller communicates with its associated MGW using a Gateway Control Protocol (GCP). In such embodiments, the process of transmitting a "connection request" to a MGW includes the steps of: 1) transmitting an ISUP Initial Address Message (IAM) from a first controller associated with a first MGW to a second controller associated with a second MGW; the IAM includes a source address for the data packets at the first MGW; and, 2) sending a resource allocation message from the second controller to the second MGW. The resource allocation message includes the source address for the data packets.

To facilitate the use of the methods disclosed herein, an exemplary MGW is also disclosed. In an exemplary embodiment, a media gateway adapted to use the methods is operative to: 1) receive a resource allocation message from a controller associated with the MGW, the resource allocation message including a source address for data packets; 2) define and store an association between the address associated with the remote MGW and an address associated with the MGW; 3) receive a broadcast message at the MGW, the broadcast message including a source address; 4) if the broadcast message includes an unknown destination indicator, query the mapping table using the source address of the broadcast message; 5) if the source address of the broadcast message is found in the mapping table, retrieve the address associated with the MGW that is mapped to the source address; and, 6) route the broadcast message to the address associated with the MGW, whereby the broadcast message is communicated through the MGW without the remote MGW knowing the address associated with the MGW. The MGW can then send a message to the source MGW to inform it of the particular port address to which subsequent data packets can be sent, thereby eliminating any further need for the source MGW to send such data packets using broadcast messages.

The methods disclosed herein, and MGWs adapted to employ such methods, are preferably implemented using software-definable processes that can be executed by general or specific purpose computer systems. Those skilled in the art are familiar with the implementation of such processes using software, hardware, firmware, or a combination thereof. The principles of the present invention are not limited to any specific implementation thereof, and all such embodiments are intended to be within the scope of the claims recited hereinafter.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which:

FIG. 3 illustrates an exemplary port mapping table for use with the exemplary system illustrated in FIG. 2; and FIG. 4 illustrates an exemplary method for routing data packets through a "connectionless" packet-switched network, without bearer channel control signaling.

DETAILED DESCRIPTION

To better understand the features and advantages of the invention disclosed herein, a brief description of a prior art system for routing data packets through a "connection-oriented" network using bearer channel control signaling is first described. Using the system 100 illustrated in FIG. 1, it is desired to communicate some form of media data, such as voice, video or data, between a first Media Gateway (MGW) 120-A and a second MGW 120-B. The data is to be transmitted through a connection-oriented network, such as an Asynchronous Transfer Mode (ATM) network.

A Media Gateway Controller (MGW-C) 110-A and MGW-C 110-B are associated with MGWs 120-A and 120-B, respectively. A MGW-C can communicate with a MGW using a conventional Gateway Control Protocol (GCP); those skilled in the art are familiar with such protocols, and the principles of the present invention are not limited to any particular form thereof. Communications between MGW-Cs can be based on Signaling System 7 (SS7) control signaling, including the Integrated Services Digital Network (ISDN) User Part (ISUP), also known to those skilled in the art. The bearer channel control signaling between MGWs depends on the bearer type; for connection-oriented ATM networks, an ATM Adaptation Layer (AAL) protocol can be used to setup a bearer channel between two MGWs. In contrast, Internet Protocol (IP) based networks are connectionless, and bearer channel control signaling is not available.

Figure 1:
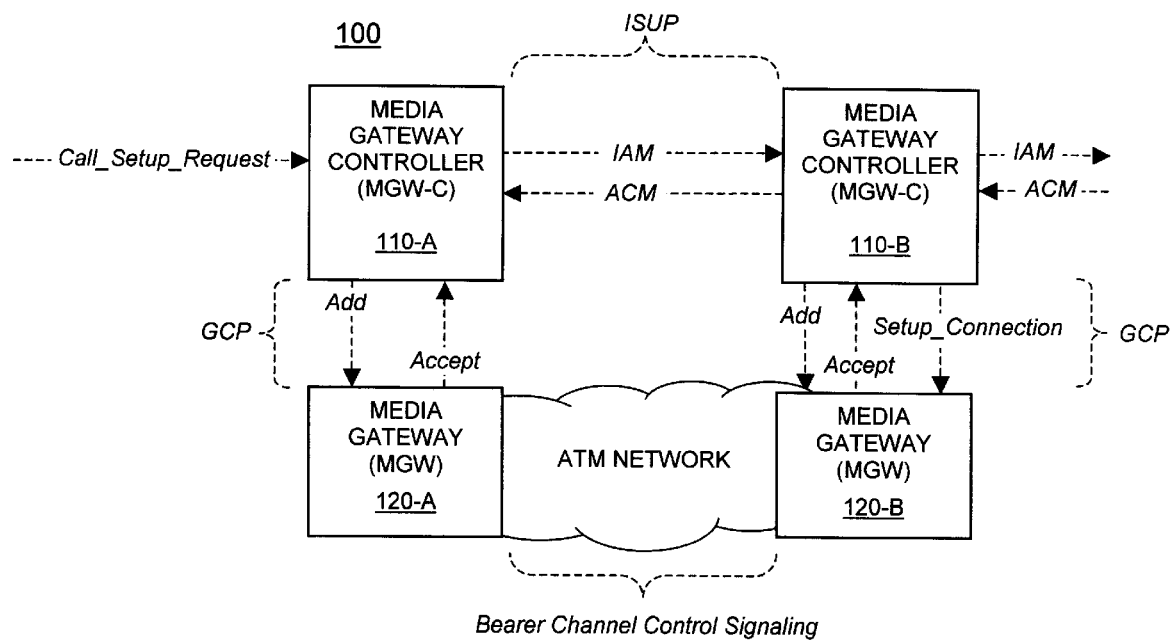
FIG. 1 illustrates a block schematic of a prior art system for routing data packets through a "connection-oriented" network using bearer channel control signaling.

To illustrate the problem associated with the prior art system illustrated in FIG. 1, when the connection-oriented network is replaced with a connectionless network, assume that MGW-C 110-A receives a request for call setup (Call_Setup_Request); a request for call setup can be received from an external network, such as a wireless network or a wireline network, such as the Public Switched Telephone Network (PSTN). The MGW-C 110-A sends an Add request to the MGW 120-A using, for example, a conventional GCP; the Add request instructs the MGW 120-A to allocate resources for routing media data. The MGW 120-A acknowledges the Add request with an Accept message. The MGW-C 110-A then sends an ISUP Initial Address Message (IAM) to MGW-C 110-B. Upon receiving the IAM, the MGW-C 110-B sends an Add request to the MGW 120-B, instructing it to allocate resources for receiving media data from MGW 110-A; the MGW 120-B acknowledges the Add request with an Accept message.

Once the MGW 120-B has allocated the necessary resources, the MGW-C 110-B then sends the IAM to the external network (not shown) and, upon receiving an acknowledgement, or Address Completion Message (ACM), the MGW-C 110-B sends a Setup_Connection request to the MGW 120-B, which instructs it to establish a connection with MGW 120-A. The MGW-C 110-B also sends the ACM to the MGW-C 110-A. At this point, when the core network is an ATM network, the MGW 120-B will establish a connection with MGW 120-A using AAL bearer channel control signaling. In contrast, no such bearer channel control signaling exists for IP-based core networks and, thus, there is no facility for MGW 120-B to notify MGW 120-A of the resources allocated for the call.

As noted previously, there has begun a convergence in recent years of communications networks, including the use of the public Internet for the transmission of voice calls historically carried by the PSTN, as well as the transmission of audio, video and computer data. Unlike the PSTN, the Internet is a "connectionless" network that does not require a bearer channel to be established between a sender and receiver before any messages are transmitted.

Figure 2:
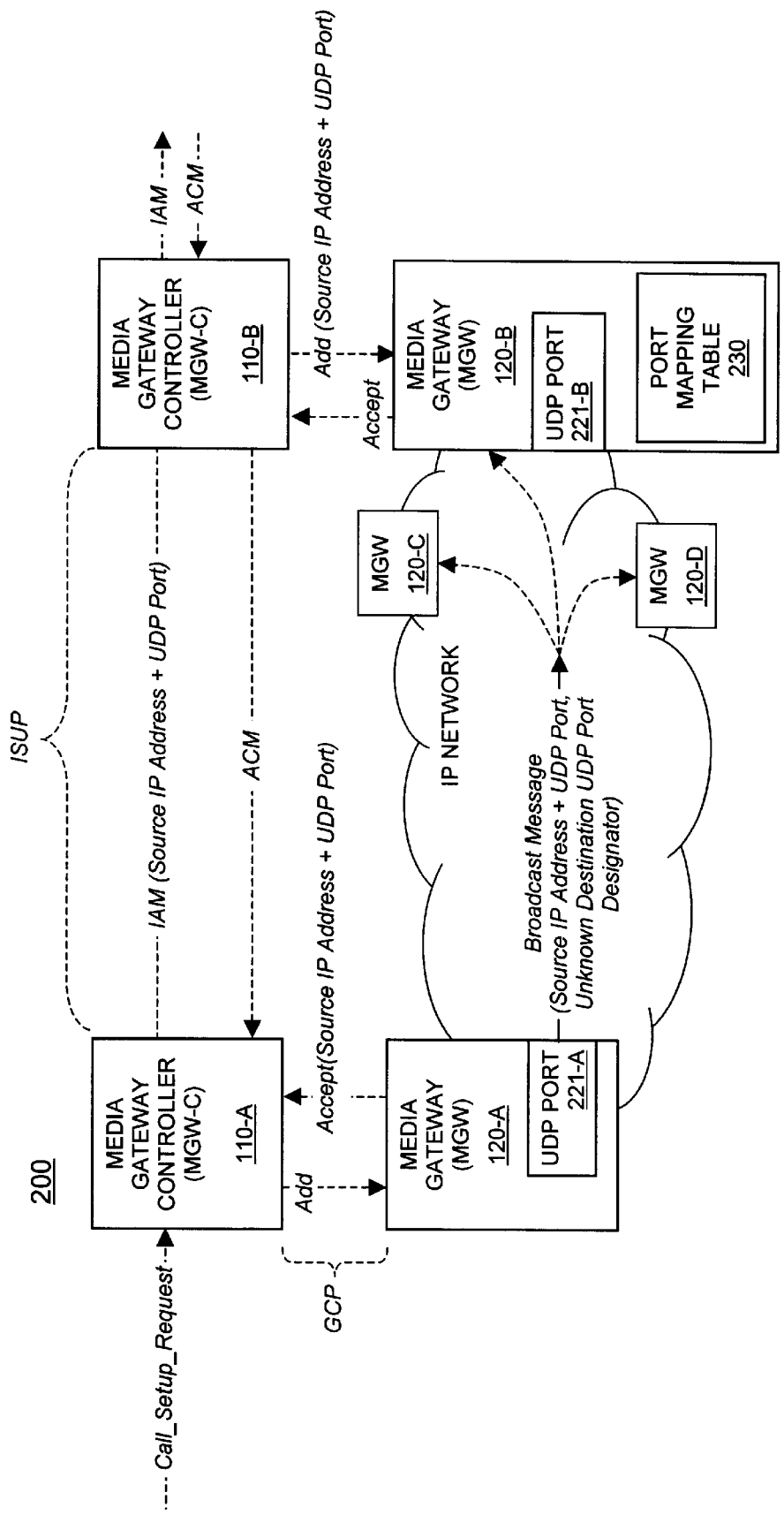
FIG. 2 illustrates a block schematic of an exemplary system for routing data packets through a "connectionless" packet-switched network, without bearer channel control signaling.

Referring now to FIG. 2, illustrated is a block schematic of an exemplary system 200 for routing data packets through a "connectionless" packet-switched network, without bearer-control signaling. The network components illustrated in FIG. 2 are essentially the same as those illustrated in FIG. 1, with the exception that the network medium connecting MGW 120-A and 120-B is a connectionless network, such as an Internet Protocol (IP) based network, and MGW 120-B includes modifications to provide the functionality disclosed herein. As illustrated in FIG. 2, MGW 120-A and 120-B each assign a User Datagram Protocol (UDP) port 221-A and 221-B, respectively, as a resource for transmitting and receiving media data through the IP network; additional UDP ports can be used to route additional media data streams. In addition, MGW 120-B provides a Port Mapping Table that, as described in detail hereinafter, is used to associate UDP port 221-A to UDP port 221-B.

To implement the principles of the present invention, a fixed, or dedicated, UDP port address is defined for unknown destination UDP ports, and the dedicated UDP port address is known to all nodes in the IP core network. When a MGW, such as MGW 120-B, receives a request to establish a connection with a particular UDP port of another MGW, such as MGW 120-A, it creates a port mapping table to store an association between the remote MGW UDP port and a selected one of its UDP ports.

To illustrate, assume that the UDP port 221-A selected by MGW 120-A has an address "5555." The ISUP IAM format includes originating point code (OPC), destination point code (DPC), and circuit identification code (CIC) fields. The IP address of MGW 120-A can be communicated to MGW 120-B, via MGW-C 110-A and 110-B, using the OPC field of the IAM, and the selected UDP port can be sent to MGW 120-B by mapping it to a CIC.

Now, assume that MGW-C 110-A receives a request for call setup (Call_Setup_Request). The MGW-C 110-A sends an Add request to the MGW 120-A using, for example, a conventional GCP; the Add request instructs the MGW to allocate resources for routing media data to MGW 120-B. The MGW 120-A reserves the resource UDP Port 221-A having, for example, address "5555," and acknowledges the Add request with an Accept message, which includes the Source IP Address of MGW 120-A and the reserved UDP Port. The MGW-C 110-A then sends an ISUP Initial Address Message (IAM) to MGW-C 110-B; the IAM includes the IP address of MGW 120-A in the OPC field, and the reserved UDP Port address "5555" in the CIC field. Upon receiving the IAM, the MGW-C 110-B sends an Add request to the MGW 120-B, instructing it to allocate resources for receiving media data from MGW 110-A; the Add request includes the IP address of MGW 120-A and the reserved UDP Port.

When MGW 120-B receives the Add request, it selects a UDP Port address, such as "6666," and adds an entry to a port mapping table 230 that maps the source address (IP address plus UDP Port) to the selected UDP Port address. For example, as illustrated in FIG. 3, the source address, which includes the IP, or "external," node address of MGW 120-A and UDP port address "5555" are mapped to the selected, or "internal," UDP port address "6666." The MGW 120-A is unaware of this mapping and, thus, does not know the destination UDP port address. Once the MGW 120-B has assigned the resource UDP port 221-B, it acknowledges the Add request with an Accept message, and the MGW-C 110-B then sends the IAM to the external network (not shown) and, upon receiving an acknowledgement, or Address Completion Message (ACM), the MGW-C 110-B forwards the ACM to MGW-C 110-A.

When the MGW 120-A needs to send a data packet to MGW-120-B for the particular call, it transmits a broadcast message to the IP network, including its own Source IP address and UDP port address ("5555") and the dedicated unknown destination port address ("5000"), or "designator," in the destination port address. This broadcast message is received by multiple MGWs within the broadcast zone of the message, including MGWs 120-B, 120-C and 120-D. When the MGWs 120-B, 120-C and 120-D receive this broadcast message, each one determines that the node sending the packet (MGW 120-A) does not know the destination port address because the destination port address field contains the dedicated unknown port designator. The MGWs 120-B, 120-C and 120-D then query their respective port mapping tables using the source IP, or "external node," address and external UDP port address ("5555") to determine the proper internal UDP port address, if any, to which the message should be routed. Because MGWs 120-C and 120-D have not previously received a request to allocate resources for the particular call, they can simply disregard the broadcast message. MGW 120-B, however, did previously receive such a request and allocated its UDP port 221-B having the address "6666" for the call associated with the broadcast message. Thus, the MGW 120-B routes the broadcast message to the UDP port 221-B having the address "6666."

When MGW 120-B needs to send a data packet to MGW 120-A, it already knows the proper UDP port address of MGW 120-A associated with a particular call. In the example illustrated and described with reference to FIGS. 2 and 3, the destination UDP port address for a data packet to be sent from MGW 120-B to MGW 120-A would be "5555." Thus, a data packet sent from MGW 120-B to MGW 120-A would include a source UDP port address of "6666" and a destination UDP port address of "5555." Once MGW 120-B has sent such a message to MGW 120-A, MGW 120-A knows the actual destination port address for the particular call, and can thus send subsequent data packets for that call directly to that destination without the need to use a broadcast message. Those skilled in the art will recognize that this method does not require a port mapping table in MGW 120-A—at least for calls originated through MGW-C 110-A. A port mapping table is preferably established in MGW 120-A, however, for storing the actual destination port address for each call once such information is received from a destination MGW, such as MGW 120-B, to obviate the need to send subsequent data packets using a broadcast message.

Referring now to FIG. 4, illustrated is an exemplary method 400 for routing data packets through a "connectionless" packet-switched network, without bearer-control signaling, according to the principles of the present invention. In general, the method 400 includes the steps of: 1) receiving a connection request associated with a remote MGW, wherein the connection request includes a source address associated with the remote MGW (Step 410); 2) reserving a local MGW UDP port (Step 420); 3) defining an association between the source address of the remote MGW and the reserved local MGW UDP port (Step 430); and 4) acknowledging the request from the remote MGW (Step 440). For the exemplary embodiment described with reference to FIGS. 2 and 3, the source address includes an Internet Protocol (IP) address of the remote MGW (MGW 120-A) and a port address associated therewith, such as a User Datagram Protocol (UDP) port designator. In order to route data packets through the second MGW (MGW 120-B), when the remote MGW (MGW 120-A) does not provide a particular UDP port address, an association is defined between the source address and a particular port address of the second MGW; this association can be stored in a port mapping table (430).

Subsequently, in Step 450, the MGW 120-B receives a Broadcast Message from a remote MGW UDP port. In Step 460, the MGW 120-B determines whether the Broadcast Message includes an unknown local MGW UDP port indicator. If the Broadcast Message includes a specific UDP port indicator (i.e., it does not include an "unknown" UDP port indicator, the message is forwarded to the specified UDP port (Step 490). If the Broadcast Message does include an unknown port indicator, however, the MGW 120-B queries its port mapping table 230, using the source address of the Broadcast Message, to determine if there is an association between the source address and a local MGW UDP port (Step 470). If an association does not exist (Step 480), the message is disregarded (Step 495). If an association does exist (Step 480), however, meaning that a previous request has been received by the MGW 120-B to reserve local resources, the Broadcast Message is forwarded, or routed, to the associated local MGW UDP port.

As noted previously, when MGW 120-B needs to send a data packet to MGW 120-A, it already knows the proper UDP port address of MGW 120-A associated with a particular call. In the example illustrated and described with reference to FIGS. 2 and 3, the destination UDP port address for a data packet to be sent from MGW 120-B to MGW 120-A would be "5555." Thus, a data packet sent from MGW 120-B to MGW 120-A would include a source UDP port address of "6666" and a destination UDP port address of "5555." Once MGW 120-B has sent such a message to MGW 120-A, MGW 120-A knows the actual destination port address for the particular call, and can thus send subsequent data packets for that call directly to that destination without the need to use a broadcast message. Those skilled in the art will recognize that the exemplary method 400 does not require a port mapping table in MGW 120-A, but the method could further include the creation of such a table for storing the actual destination port address for each call once such information is received from a destination MGW, such as MGW 120-B, to obviate the need to send subsequent data packets using a broadcast message.

The present invention provides significant advantages to communications systems, in general, and the invention is particularly advantageous in communications networks that use connection-oriented control networks in combination with connectionless core networks. The principles of the invention can be advantageously used to control the routing of data packets through a connectionless packet-switched network, without bearer channel control signaling, thereby furthering the convergence of conventional connection-oriented communications networks, such as the PSTN, with connectionless packet-switched networks, such as the Internet. In particular, the systems and methods disclosed herein are transparent to a control network that utilizes ISUP protocols; i.e., no modifications to standard ISUP protocols are required.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for controlling the routing of data packets through a packet-switched network, said method comprising the steps of:

receiving a connection request associated with a remote media gateway (MGW) at a second MGW, said connection request including an address associated with said remote MGW, wherein said connection request is received by a controller associated with said second MGW from a controller associated with said remote MGW, said controllers communicating using an Integrated Services Digital Network User Part (ISUP) protocol;

defining an association between said address associated with said remote MGW and an address associated with said second MGW;

storing said address associated with said remote MGW and said address associated with said second MGW in a mapping table;

receiving a broadcast message at said second MGW, said broadcast message including a source address;

if said broadcast message includes an unknown destination indicator, querying said mapping table using said source address of said broadcast message;

if said source address of said broadcast message is found in said mapping table, retrieving the address associated with said second MGW that is mapped to said source address; and, routing said broadcast message to said address associated with said second MGW, whereby said broadcast message is communicated through said second MGW without said remote MGW knowing the address associated with said second MGW.

2. The method recited in claim 1, wherein said source address comprises a port address associated with said remote MGW.

3. The method recited in claim 2, wherein said step of defining an association between said address associated with said remote MGW and an address associated with said second MGW comprises the step of associating said port address associated with said remote MGW and a particular port address of said second MGW in a port mapping table.

4. The method recited in claim 3, wherein said step of routing said broadcast message received at said second MGW from said source address associated with said remote MGW comprises the steps of:

querying said port mapping table using said port address associated with said remote MGW to determine said particular port address of said second MGW; and routing said broadcast message to said particular port address.

5. The method recited in claim 1, wherein said packet-switched network utilizes an Internet Protocol (IP) transport mechanism.

6. The method recited in claim 1, wherein each said controller communicates with its associated MGW using a Gateway Control Protocol (GCP).

7. A method for controlling the routing of data packets through a packet-switched network, said method comprising the steps of:

transmitting an Integrated Services Digital Network User Part (ISUP) Initial Address Message (IAM) from a first, controller associated with a first media gateway (MGW) to a second controller associated with a second MGW, said IAM including a source address for said data packets at said first MGW;

sending a resource allocation message from said second controller to said second MGW, said resource allocation message including said source address for said data packets;

defining an association between said source address for said data packets and an address associated with said second MGW;

storing said source address for said data packets and said address associated with said second MGW in a mapping table;

receiving a broadcast message at said second MGW, said broadcast message including a source address; and if said broadcast message includes an unknown destination indicator, querying said mapping table using said source address of said broadcast message;

if said source address of said broadcast message is found in said mapping table, retrieving the address associated with said second MGW that is mapped to said source address; and, routing said broadcast message to said address associated with said second MGW, whereby said broadcast message is communicated through said second MGW without said first MGW knowing the address associated with said second MGW.

8. The method recited in claim 7, wherein said source address comprises a port address associated with said first MGW.

9. The method recited in claim 8 wherein said step of defining an association between said address associated with said first MGW and an address associated with said second MGW comprises the step of associating said port address associated with said first MGW and a particular port address of said second MGW in a port mapping table.

10. The method recited in claim 9, wherein said step of routing said broadcast message received at said second MGW from said source address associated with said first MGW comprises the step of:
   querying said port mapping table using said port address associated with said first MGW to determine said particular port address of said second MGW; and
   routing said broadcast message to said particular port address.

11. The method recited in claim 7, wherein said packet-switched network utilizes an Internet Protocol (IP) transport mechanism.

12. The method recited in claim 7, wherein each said controller communicates with its associated MGW using a Gateway Control Protocol (GCP).

13. A media gateway (MGW) for routing data packets received through a packet-switched network, said MGW operative to:
   receive a connection request associated with a remote (MGW), said connection request including an address associated with said remote MGW, wherein said connection request is received by said MGW from a controller associated with said MGW upon said controller receiving an Integrated Services Digital Network User Part (ISUP) Initial Address Message (IAM) from a remote controller associated with said remote MGW, said IAM including said address associated with said remote MGW;
   defining an association between said address associated with said remote MGW and an address associated with said MGW;
   storing said address associated with said remote MGW and said address associated with said MGW in a mapping table;
   receiving a broadcast message at said MGW, said broadcast message including a source address;
   if said broadcast message includes an unknown destination indicator, querying said mapping table using said source address of said broadcast message;
   if said source address of said broadcast message is found in said mapping table, retrieving the address associated with said MGW that is mapped to said source address; and,
   routing said broadcast message to said address associated with said MGW, whereby said broadcast message is communicated through said MGW without said remote MGW knowing the address associated with said MGW.

14. The MGW recited in claim 13, wherein said address associated with said remote MGW comprises a port address of said remote MGW.

15. The MGW recited in claim 14, wherein said MGW defines said association between said address associated with said remote MGW and said address associated with said MGW by associating said port address of said remote MGW and a particular port address of said MGW in a port mapping table.

16. The MGW recited in claim 15, wherein said MGW is operative to:
   query said port mapping table using said port address of said remote MGW to determine said particular port address of said MGW; and
   route said broadcast message to said particular port address.

17. The MGW recited in claim 13, wherein said packet-switched network utilizes an Internet Protocol (IP) transport mechanism.

18. The MGW recited in claim 13, wherein each said controller communicates with its associated MGW using a Gateway Control Protocol (GCP).

* * * * *